(12) United States Patent
Gibb (10) Patent No.: US 10,562,646 B2
(45) Date of Patent: Feb. 18, 2020

(54) SINGLE-POINT RELEASE MECHANISM FOR SPACECRAFT

(71) Applicant: LOCKHEED MARTIN CORPORATION, Bethesda, MD (US)

(72) Inventor: John L. Gibb, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 396 days.

(21) Appl. No.: 15/493,059

(22) Filed: Apr. 20, 2017

(65) Prior Publication Data

US 2017/0305578 A1    Oct. 26, 2017

Related U.S. Application Data

(60) Provisional application No. 62/325,941, filed on Apr. 21, 2016.

(51) Int. Cl.
*B64G 1/22* (2006.01)
*B64G 1/44* (2006.01)

(52) U.S. Cl.
CPC .............. *B64G 1/222* (2013.01); *B64G 1/44* (2013.01)

(58) Field of Classification Search
CPC . B64G 1/22; B64G 1/222; B64G 1/24; B64G 1/58; B64G 1/645

USPC ................. 244/171.7, 171.8, 172.9, 173.3
See application file for complete search history.

(56) References Cited

U.S. PATENT DOCUMENTS

| 6,126,115 | A  | * | 10/2000 | Carrier ................ | B64G 1/641 244/137.4 |
| 8,056,862 | B1 | * | 11/2011 | Tomerlin .............. | B64G 1/58 244/159.1 |
| 2005/0082038 | A1 | * | 4/2005 | Korpan ................ | B64G 1/503 165/104.21 |
| 2010/0215424 | A1 | * | 8/2010 | Crookston ........... | B64G 1/222 403/6 |

FOREIGN PATENT DOCUMENTS

WO    WO-2018065704 A1 *    4/2018    ............. B64G 1/222

* cited by examiner

*Primary Examiner* — Stephen Johnson
(74) *Attorney, Agent, or Firm* — Morgan, Lewis & Bockius LLP (57) ABSTRACT

A spacecraft includes a main body, a set of panels attached to a side of the main body, and a retaining the set of panels adjacent to the main body. The single-point release device includes a heater for generating heat to expand a thermally sensitive material, a membrane-based actuator for providing a linear movement based on a phase change of the thermally sensitive material contained in the membrane-based actuator, and a release fitting and a release rod for retaining and selectively releasing a pin based on the linear movement of the membrane-based actuator. The membrane-based actuator is configured to push the pin through the release fitting.

20 Claims, 8 Drawing Sheets

SINGLE-POINT RELEASE MECHANISM FOR SPACECRAFT

CROSS-REFERENCE TO RELATED APPLICATIONS

This application claims the benefit of U.S. Provisional Application No. 62/325,941, entitled "VALUE-ENGINEERED SOLAR ARRAYS FOR SPACECRAFT," filed Apr. 21, 2016, the entirety of each of which is incorporated herein by reference.

STATEMENT REGARDING FEDERALLY SPONSORED RESEARCH OR DEVELOPMENT

Not applicable.

TECHNICAL FIELD

The present description relates in general to deployment arrangement for spacecraft, and more particularly to, for example, without limitation, single-point release mechanism for spacecraft.

BACKGROUND OF THE DISCLOSURE

Spacecraft are commonly equipped with deployable solar panels. The solar panels can convert the solar energy from the Sun to electrical energy to satisfy some of the power for its mission. During launch, the solar panels are maintained in a stowed position and later changed to a deployed position. A plurality of release mechanisms has been widely used to release the solar panels.

The description provided in the background section should not be assumed to be prior art merely because it is mentioned in or associated with the background section. The background section may include information that describes one or more aspects of the subject technology.

BRIEF SUMMARY OF THE DISCLOSURE

The description in this summary section may provide some illustrative examples of the disclosure. This section is not intended to be a broad overview or to identify essential elements of the disclosure.

According to some embodiments, a spacecraft comprises a main body, a set of panels attached to a side of the main body, and a single-point release device retaining the set of panels adjacent to the main body. The single-point release device comprises a heater for generating heat to expand a thermally sensitive material, a membrane-based actuator that provides a linear movement based on a phase change of the thermally sensitive material contained in the membrane-based actuator, and a release fitting and a release rod for retaining and selectively releasing a pin based on the linear movement of the membrane-based actuator. The membrane-based actuator is configured to push the pin through the release fitting.

The single-point release device comprises a housing for retaining the membrane-based actuator, the release fitting and the pin. The membrane-based actuator and the pin are disposed within a horizontal space defined in the housing. The release fitting is disposed within a vertical space defined in the housing. The single-point release device comprises a snubber mount positioned on the housing for retaining a snubber connected to the single-point release device. The snubber can be mounted on the center of the set of panels.

The single-point release device comprises a release nut coupled to the release rod. A diameter of the release nut being greater than a diameter of the release rod. The release rod is projected through the set of panels when the set of panels is in a stowed position.

In some aspects of the subject technology, the release rod is configured to deploy the set of panels to a deployed position. The heater can be disposed adjacent to the membrane-based actuator for activating the single-point release device in response to receiving an electrical signal. The heater comprises a plurality of electrical systems to activate the heater. The membrane-based actuator comprises a membrane disposed between the thermally sensitive material and the pin. The thermally sensitive material can be a paraffin wax. The thermally sensitive material is expanded to extend the membrane-based actuator toward the pin.

In some aspects of the subject technology, a spacecraft comprises a main body, one or more panels attached to a first end of the main body. The one or more panels are deployable from a stowed position to a deployed position. The spacecraft further comprises a single-point release device attached to the one or more panels. The one or more panels are retained in the stowed position by only one single-point release device. The single-point release device comprises an actuator that provides a mechanical movement based on a thermally sensitive material contained in the actuator. The thermally sensitive material is configured to expand upon receiving a thermal energy and cause the actuator to extend. The single-point release device further includes a release fitting and a release rod for retaining and selectively releasing a pin. The extended actuator is configured to push the pin to release the pin from the release fitting.

In some aspects of the subject technology, the single-point release device can comprise a release nut coupled to the release rod for restricting a movement of the one or more panels when the one or more panels are in the stowed position, and a heating source engaged with the actuator. The heating source receives a signal from the main body to generate the thermal energy. The spacecraft further comprises a set of snubbers mounted on a panel of the one or more panels. The set of snubbers comprises a central snubber mounted in the center of the panel. The central snubber is connected to the single-point release device. The actuator further comprises a membrane disposed between the thermally sensitive material and the pin. The thermally sensitive material can be a paraffin wax.

In some aspects of the subject technology, a method of actuating a single-point release mechanism comprises: receiving an electrical signal to activate a heating source mounted on a spacecraft body; receiving, at a membrane-based actuator, a thermal energy from the heating source, the thermal energy expands a thermally sensitive material contained in the membrane-based actuator, the expanded thermally sensitive material extends the membrane-based actuator; releasing a pin from a release fitting by facilitating a movement of the membrane-based actuator, the extended membrane-based actuator is configured to push the pin through the release fitting; and upon releasing the pin from the release fitting, deploying a plurality of panels, prior to the releasing, only one single-point release mechanism retains the plurality of the panels.

In some aspects of the subject technology, the membrane-based actuator can be a deformable material-based actuator including a membrane disposed between the membrane-based actuator and the pin. The thermally sensitive material can be a paraffin wax. The membrane-based actuator is sealed to prevent leakage of the thermally sensitive material.

The method further comprises positioning a snap-in snubber on a panel of the plurality of panels. The snap-in snubber comprises a top portion and a bottom portion. The panel can be disposed between the top portion and the bottom portion of the snap-in snubber. The method can comprise enclosing a release rod by the snap-in snubber. The release rod fits within a hole defined in the snap-in snubber.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Generally, a spacecraft is launched with relatively complex release mechanism to release and deploy its solar panels in space. Existing multi-point release mechanisms involve multiple release assemblies. Each release assembly requires an actuator and sub-systems. Installation of the actuator and sub-systems may require numerous testing processes as the number of components increase. Having a greater number of components in space can also result in higher failure rates due to a compatibility issue. Furthermore, the solar panels can become heavier due to weights of multiple actuators and sub-systems. The cost of installing the multiple release assemblies can increase based on a number of assembly units. The time required to deploy the solar arrays may increase because each release assembly needs to be activated for the panel to be deployed. Since over hundreds of components are required in space with a limited power system, there has been a need for a simplified release system that enables deployment of the solar panels in a reliable, low-cost, and high efficient manner.

The present disclosure provides a high-value engineered solution for a large constellation of Low Earth Orbiting (LEO) spacecraft, providing relatively simple mechanism to release, deploy and point the solar panels toward the sun. The present disclosure reduces mechanical and electrical redundancy by minimizing failure rates of circuits or actuators associated with the release mechanism. The present disclosure further provides a reliable and time controlled mechanism to deploy the solar panels in space, providing a quick installation process, a lost cost and streamlined assembly line, and a lightweight component.

Figure 1A:
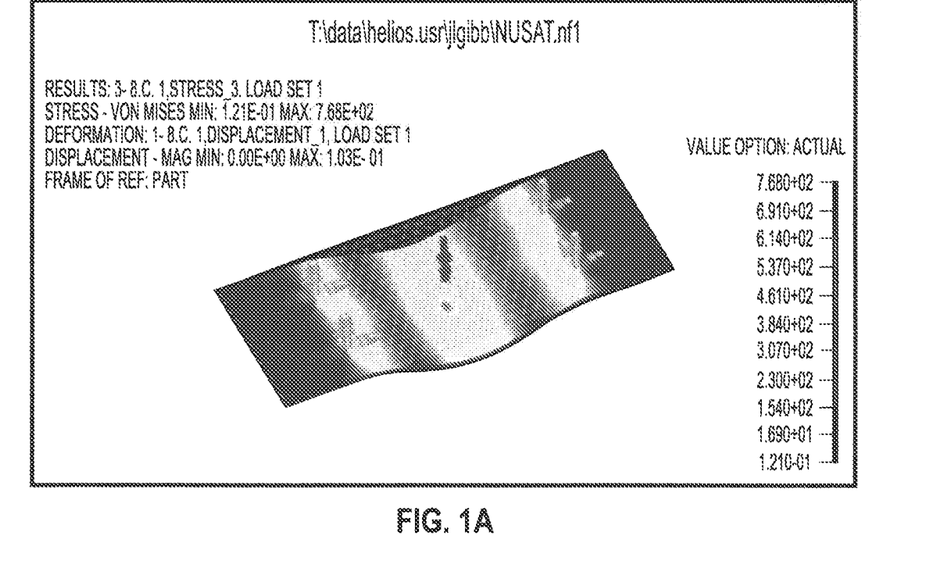
FIG. 1A illustrates an example of an elastic panel with a single-point release mechanism and FIGS. 1B and 1C illustrate perspective views of an example spacecraft with a center hole for the single-point release mechanism according to some embodiments of the present disclosure.
Figure 1B:
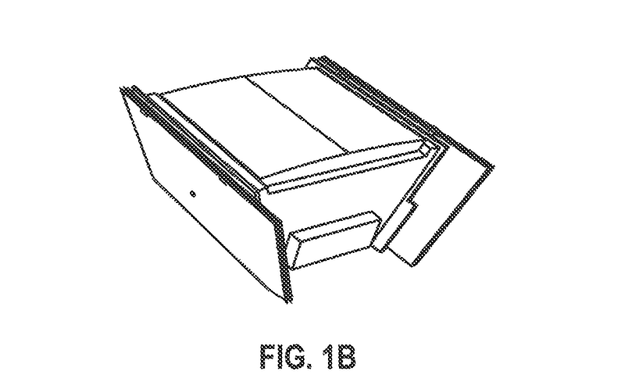
Figure 1C:
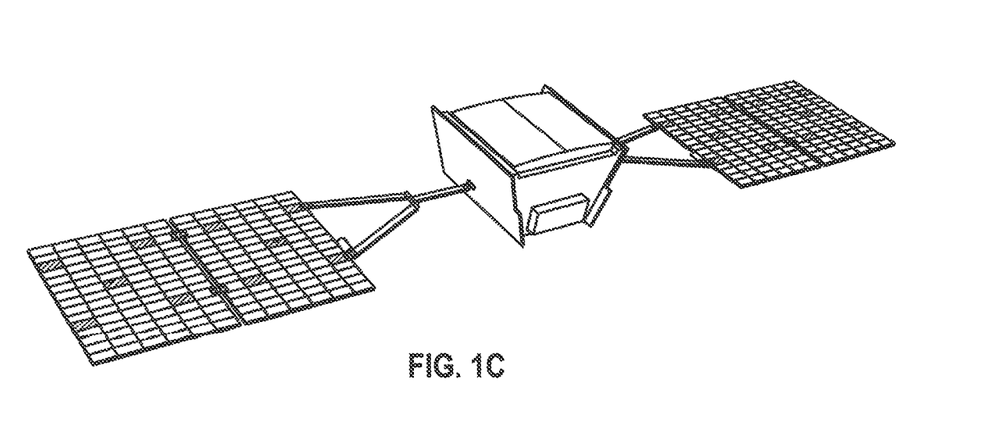

In one or more implementations, a spacecraft may include a spacecraft body, one or more solar panels mounted to the exterior (e.g., an exterior surface) of the spacecraft body and a release structure releasing the solar arrays from the spacecraft body. The one or more panels are folded over into the gap space between the panel and the spacecraft body by a hinge system. Referring to FIGS. 1A-1C, an elastic panel with a single-point release mechanism is shown. The single-point release mechanism is mounted in the center of the elastic strain of panel. During mission, the single-release mechanism can cause the elastic strain of panel to be slightly bent downward to balance the force exerted by the single-point release assembly. In some embodiments, deflection of a panel can be a result of the preload in the center of the panel. The elastic panels can be shaped to deform to withstand the compressive load exerted from the single-point release assembly. Further, a plurality of snubbers mounted on the solar panel can also withstand the compressive force from the single-point release assembly.

Figure 2A:
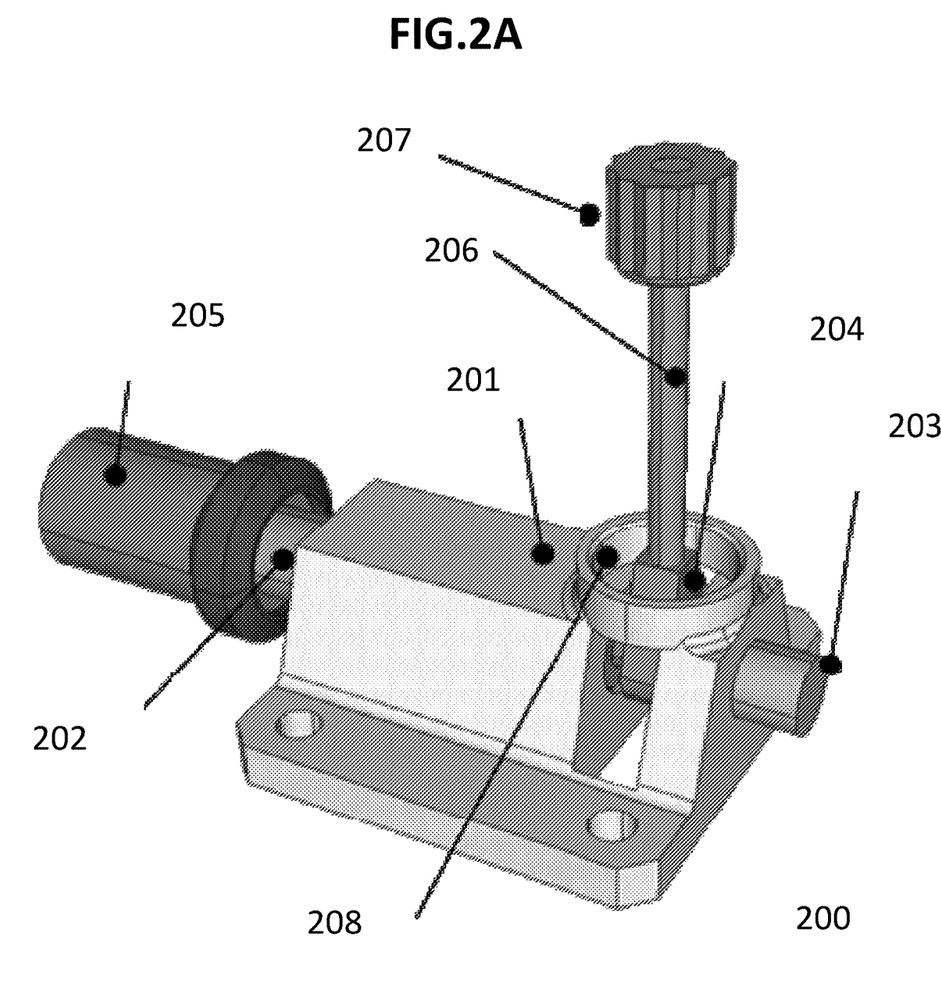
FIGS. 2A and 2B illustrate a perspective and an exploded view of an example of a single-point release system according to some embodiments of the present disclosure.
Figure 2B:
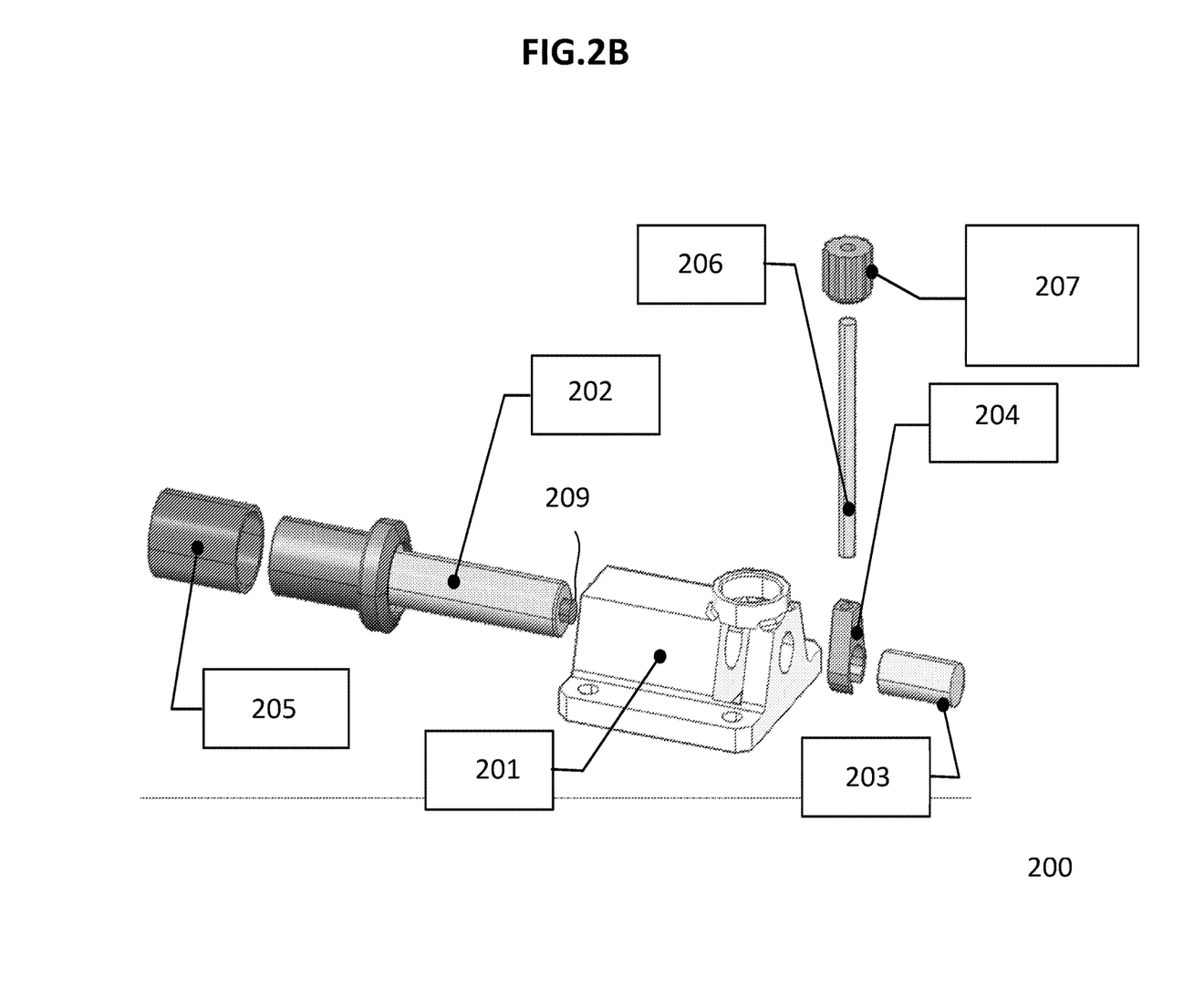

FIGS. 2A-2B illustrate an example of an assembly view of a single-point release mechanism and an exploded view of a single-point release mechanism. The single-point release mechanism 200 shown in FIG. 2 comprises a housing 201, an actuator 202 inserted to the housing 201 horizontally, and a release rod 206 inserted into the housing 201 vertically. Within the housing 201, a horizontal space can be provided between the first end and the second end of the housing. The horizontal space can be defined along an x-axis of the housing 201 that the actuator 202 can pass through linearly within the horizontal space from the first end to the second end. Within the horizontal space in the housing, a pin 203 is disposed adjacent to the actuator 202 near the second end of housing. The pin 203 and the actuator 202 are separated by a minimal gap before the single-point release mechanism is actuated.

Within the housing 201, a vertical space is provided between an upper part of the housing 201 and a lower part of the housing 201. The vertical space is defined along a z-axis of the housing 201 that a release rod 206 can pass through linearly within the vertical space. When the single-point release mechanism is actuated, the release rod 206 slides through the vertical space of the housing 201 and moves away from the spacecraft body resulting in deployment of the solar panels. The panels can be unfolded outward away from the spacecraft.

A release fitting 204 fits into the vertical space of the housing 201 and holds the pin 203 and the releases rod 206. When the single-point release mechanism is actuated, the actuator pushes the pin 203 and frees the pin 203 from the release fitting 204. Upon pushing the pin 203 out of the housing 201 (e.g., about a quarter inch), the housing 201 releases the release rod 206 from the housing 201. In some embodiments, the release fitting 204 can be a clamp.

In some embodiments, an actuator pin 209 may be used to release the pin from the release fitting 204. For example, the actuator 202 may be attached to the actuator pin 209 as illustrated in FIG. 2B. A diameter of the actuator pin 209 is smaller than a diameter of the pin 203 (e.g., 5/16 of an inch), therefore the actuator pin 209 can push the pin 203 and free the pin 203 and release fitting 204. In some embodiments, a diameter of the horizontal hole of the release fitting 204 can be same as or substantially the same as a diameter of the pin 203, making the use of actuator pin 209 more useful.

In some embodiments, the housing 201 can be mounted on the spacecraft body, and the release rod 206 can be threaded into the solar panels with tightened release nut 207. The release rod 206 is configured to comprise a release nut 207 on the opposite side from the housing 201. The release nut can be a torque limiting (ratcheting) nut. In some embodiments, a diameter of the release nut 207 can be greater than a diameter of the release rod 206. The preloaded solar panels can be disposed between the release nut 207 and the housing 201, restricting a movement of the solar panels between the spacecraft body and the release nut 207 when the panels are in a stowed position.

In some embodiments, a cup and cone fitting can be associated with the release rod 206 and the release nut 207 with respect to the solar panels. The cup and cone fitting can help to take the compressive load from the release rod 206. In some embodiments, the release nut 207 may pull against the release fitting 204 and exerts a force on the release rod 206 to balance the compressive force on the panel. In some embodiments, a spring can be inserted underneath the release nut 207. The spring can pull the release rod 206 and the release nut 207 clear from the assembly when panels are deployed. The deployment arrangement of the solar panels with respect to the single-point release mechanism is further explained in connection with FIGS. 3A-3B and FIG. 6.

Figure 3A:
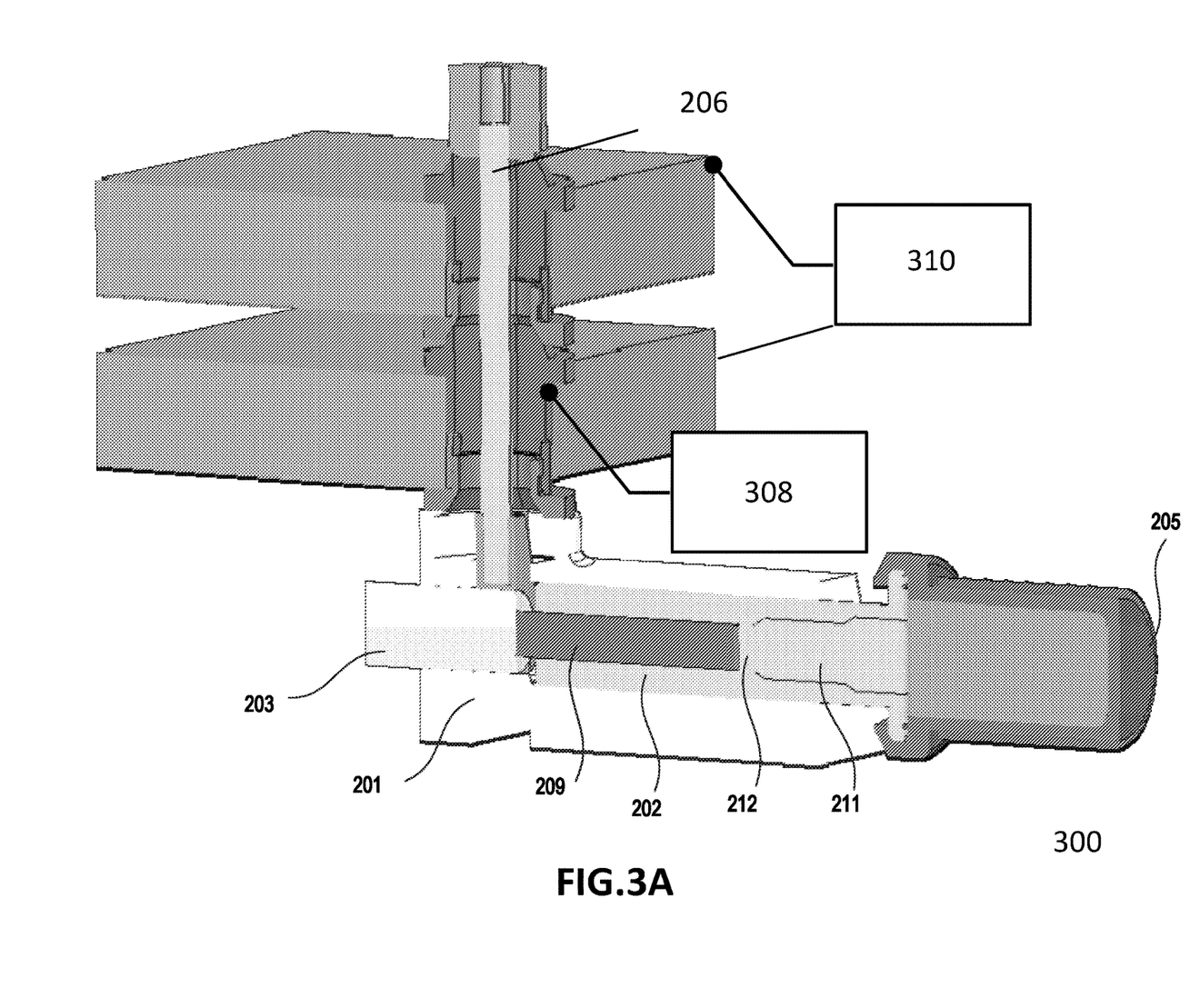
FIGS. 3A and 3B illustrate cross-sectional views of a single-point release mechanism with panels according to some embodiments of the present disclosure.

The actuator 202 can comprise thermally sensitive material 211 as its substance (as shown in FIG. 3A). The thermally sensitive material 211 is contained in the actuator and expands upon receiving a thermal energy from the heating source 205. Upon receiving the thermal energy, the thermally sensitive material 211 can change its phase from solid to liquid. The thermally sensitive material 211 expands inside of the actuator 202 as the phase of the thermally sensitive material 211 changes from solid to liquid. In some embodiments, the thermally sensitive material 211 can be paraffin wax. For example, the paraffin-based actuator can control the temperature of the paraffin wax relatively faster and easier than other methods.

In some embodiments, the actuator 202 can be hermetically sealed and prevents leakage of the paraffin wax during its phase change. The actuator 202 can be deformable material that deforms its structure upon the thermally sensitive material 211 expands. For example, the actuator 202 can be deformable membrane-based actuator. Some deformable membrane-based actuator can include a membrane 212 disposed between the membrane-based actuator and the pin (as shown in FIG. 3A). In some embodiments, the membrane-based actuator can be completely sealed and may not include any gaps or cracks. Generally, when the paraffin wax is contained in other types of actuator and when the paraffin wax is overheated, the overheated wax may leak out of an actuator through a unsealed interface. The paraffin wax can damage the solar panels and block the panels from receiving the solar energy. When the paraffin wax leaks, the actuator may not be extended enough to activate the release assembly. When release assembly is not activated on time, it can result in a delay in deployment of the solar panels, and further cause shortage of power in spacecraft. Therefore, the deformable membrane-based actuator using the paraffin wax as substance can deploy the solar panels on time when needed in a timely manner.

A heating source 205 can be disposed adjacent to the actuator 202 on the first end of the housing 201 and configured to generate heat upon receiving electrical signal from the spacecraft body. When the heating source 205 is energized, it heats up the thermally sensitive material 211 in the actuator 202. Upon the temperature change, the thermally sensitive material 211 expands and deforms a shape of the actuator 202. The actuator extends outward toward the second end of the housing 201. The extruding action of the actuator 202 develops a linear mechanical force and causes a movement of the actuator towards the second end of the housing. The actuator 202 moves along the horizontal gap of the housing and pushes the pin 203 (e.g., a quarter inch) to the second end of the housing 201. In some embodiments, the smaller actuator pin 209 can push the pin 203. In some instances, the use of paraffin-based thermal actuator enables the effective control of the release assembly without the need for any external power source.

In some embodiments, the heating source can be connected to a plurality of electrical systems to activate the heating source. For example, the heating source can be operated by the plurality of electrical systems upon receiving an electrical signal. The plurality of electrical systems can include a primary electrical system and one or more sub electrical systems. If the primary electrical system for activating the heating source fails, one or more sub electrical systems can provide the electrical power to activate the heating source. The plurality of the electrical systems is connected to the heating source to prevent a failure or a delay of deployment of solar panels caused by malfunction of an electrical system.

Figure 3B:
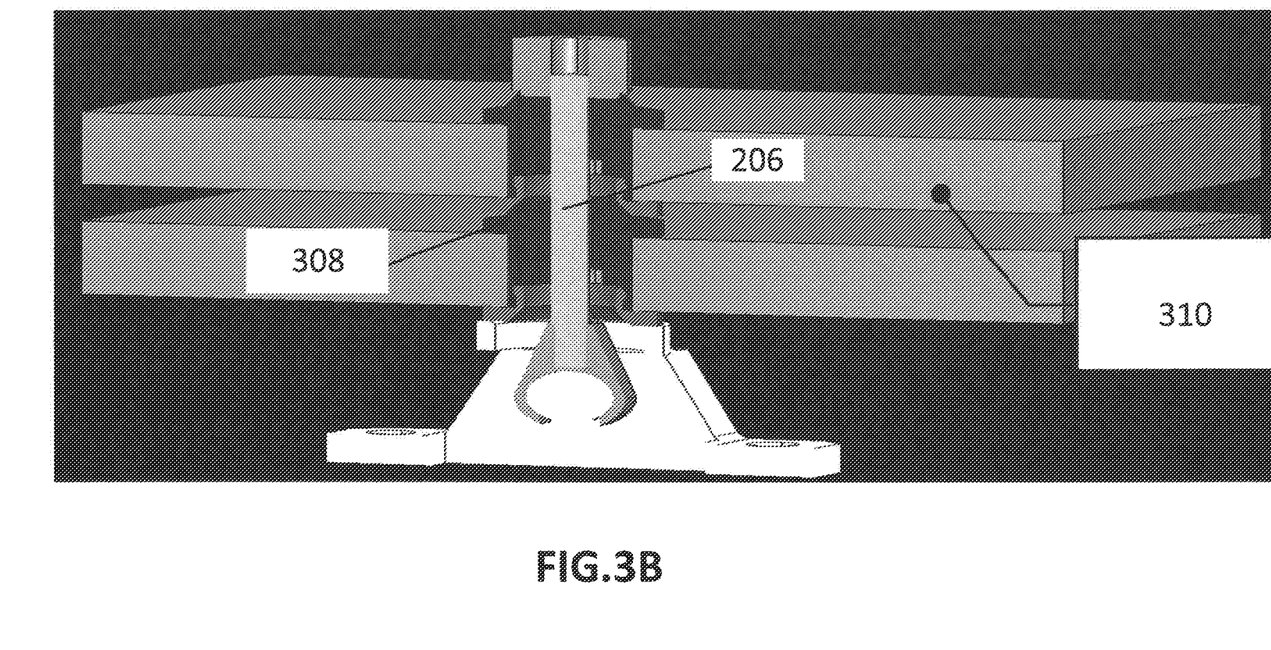

FIGS. 3A-3B illustrate cross-sectional views of a single-point release mechanism with solar panels. As described above, the single-point release mechanism 300 can be connected with a central snubber 308. For example, the snubber can be positioned in a snubber mount 208 of the single-point release mechanism and encloses the release rod. The central snubber 308 can be located in the center of the solar panel 310 with the single-point release mechanism to prevent the collision of the panels 310 and distribute the power throughout the rest of the panel 310 equally. The central pulldown mechanism of the single-point release system with the central snubber 308 allows to preload a stack of panels with a single release assembly. In some embodiments, the stack of panels can be retained by only one single-point release mechanism mounted in the center of the panels. The single-point release mechanism attached to the center of the panels can retain a set of panels in a stowed position and facilitates a deployment of the set of panels. For example, the panels attached to a right side of the spacecraft body can be retained by one single-point release mechanism adjacent to the right side of the spacecraft body. Similarly, the panels attached to a left side of the spacecraft body can be retained by one single-point release mechanism adjacent to the left side of the spacecraft body. The central snubber configuration can further be explained in connection with FIG. 6.

Figure 4A:
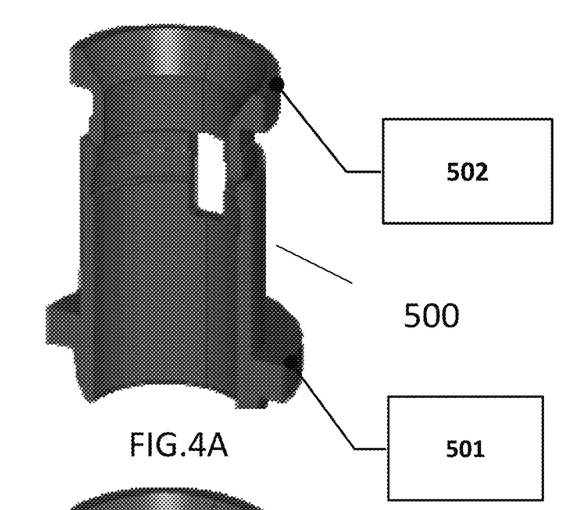
FIGS. 4A, 4B and 4C illustrate cross-sectional views and a perspective view of an example of a snap-in snubber according to some embodiments of the present disclosure.
Figure 4B:
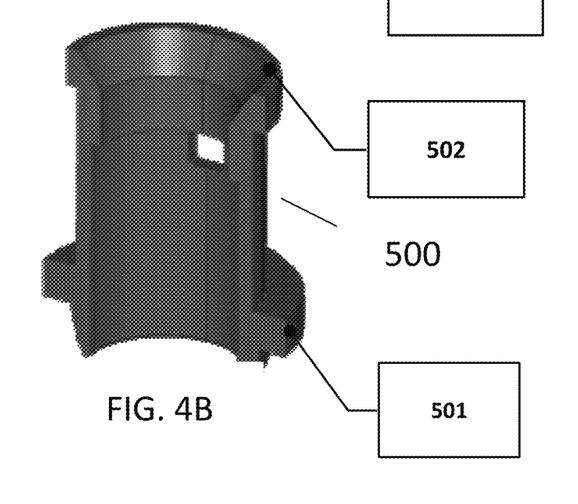
Figure 4C:
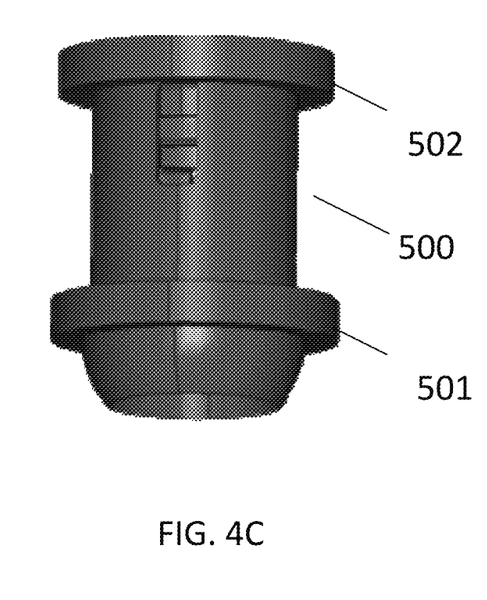

FIG. 4 illustrates an example of a snap-in snubber 500. During launch, the spacecraft including the panels may vibrate and shake due to a high speed and resistance of air. A snubber is configured to support the solar panels to minimize vibration of the solar panels. To prevent collision of solar panels, snubbers can be associated with high-stowed frequency to provide a low shock resettable system that is beneficial to the spacecraft and the payload system. In some embodiments, the snubber is associated with shear load to reduce the cost and complexity of the release devices.

Figure 5:
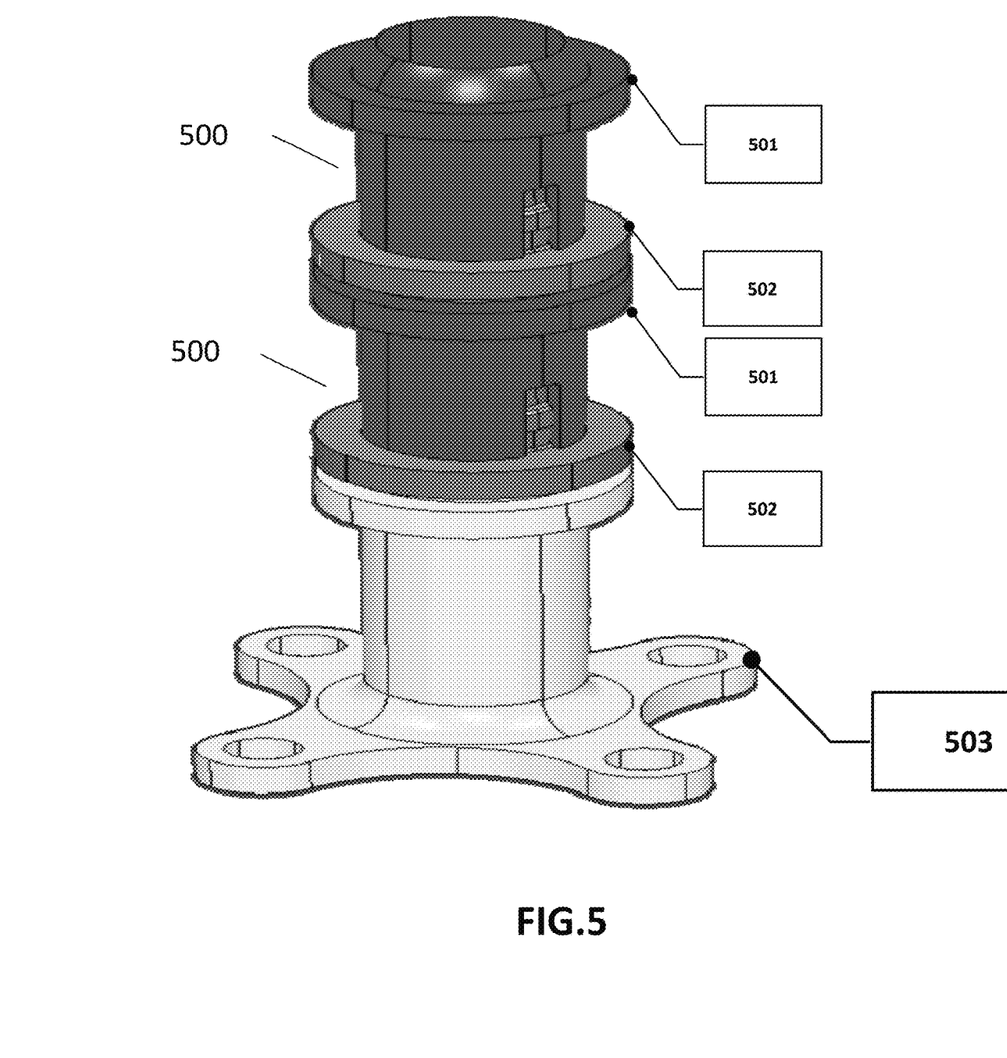
FIG. 5 illustrates a perspective view of an example of a snubber stack according to some embodiments of the present disclosure.

As shown in FIGS. 4-5, a snubber 500 comprises a top portion 502, a bottom portion 501 and a base bracket 503. The top portion 502 of the snubber 500 can be a conic shape and the bottom portion 501 can be a spherical shape. On the solar panel, the top portion 502 of the snubber 500 mates with a bottom portion 501 of the snubber 500 to hold the panel in-between. The orientation of the components may change based on the arrangements in space.

Figure 6:
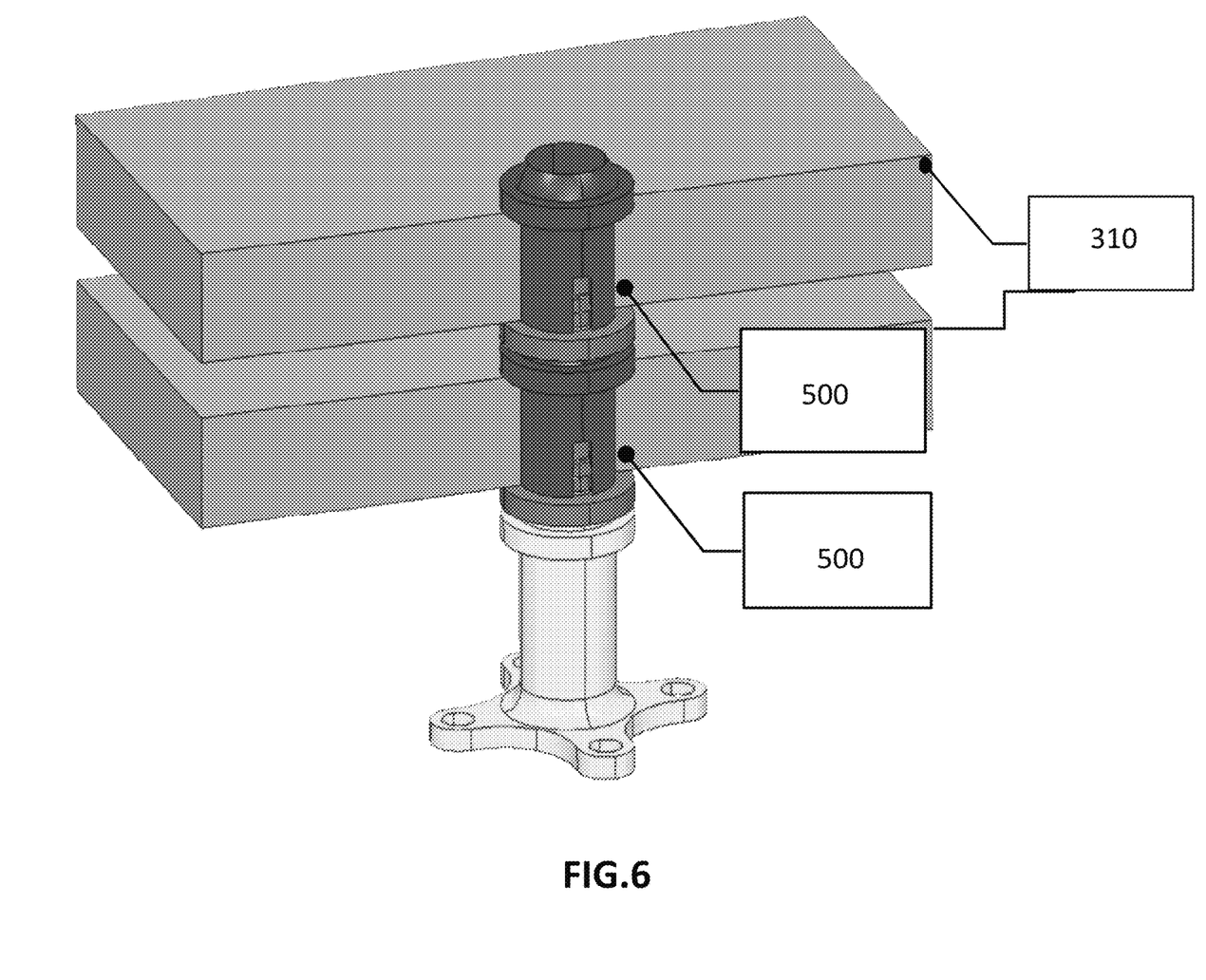
FIG. 6 illustrates a partial cross-sectional view of an example of a snubber stack with panels according to some embodiments of the present disclosure.

In some embodiments, the snubber 500 can be mated without any fastening mechanism. A cross-sectional view of a pre-mated snubber 500 is shown in FIG. 4A and a mated snubber 500 is shown in FIG. 4B. An example design of snubber 500 is shown in FIG. 4C. In some instances, the snap-in snubber 500 can be a cylindrical shape to enclose the release rod as necessary. The panels are configured to include pre-made holes for the top and the bottom portions of the snubber to fit-in and interlock each other. For example, the top portion of the snubber 500 can be injected onto an outer surface of the solar panel and the bottom portion of the snubber 500 can be injected onto an inner surface of the solar panel. The spherical bottom portion of the snubber 500 can fit into the conic top portion, and snap together. As shown in FIG. 6, the snap-in snubber 500 facilitates stacking of a plurality of panels 310 and prevents the panels 310 from sliding laterally.

As shown in FIG. 6, a plurality of snubbers 500 can be mounted on the solar panels 310. For example, as shown in FIG. 1A, four snubbers are mounted on the solar panel to transfer the compressive force exerting from the single-point release mechanism. Due to vibration from the launch, these four snubbers can shear the compressive force and provide constraint to the spacecraft surface. A determination is made to measure how much of compressive load each snubber can take. The snubbers can also be tolerant of misalignment of other snubbers when there is more than one snubber mounted on the panel. The number of snubbers mounted on the solar panels can vary depending on the arrangement. In some embodiments, a central snubber can be mounted with the single-point release mechanism in the middle of the panel as shown in FIGS. 3A-3B to distribute the force through the rest of the panel.

In some embodiments, the snubber can be made of flight-proven polymer such as Torlon or Ulterm. The snubber can be associated with 150 dB Acoustic Vibration Levels and 6400G Shock Levels. The snubber may be associated with a temperature range from −180 to +140 Celsius level. Furthermore, the degree of angle for the contact of the top portion and the bottom portions can vary based on geometric arrangements of the snubber design. In some embodiments, the snubbers can be injection-molded substrate.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the disclosure. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A spacecraft comprising:
    a main body;
    a set of panels attached to a side of the main body; and
    a single-point release device retaining the set of panels adjacent to the main body, the single-point release device comprising:
        a heater for generating heat to expand a thermally sensitive material;
        a membrane-based actuator for providing a linear movement based on a phase change of the thermally sensitive material contained in the membrane-based actuator; and
        a release fitting and a release rod for retaining and selectively releasing a pin based on the linear movement of the membrane-based actuator, the membrane-based actuator being configured to push the pin through the release fitting.

2. The spacecraft of claim 1, wherein the single-point release device further comprises:
    a housing for retaining the membrane-based actuator, the release fitting and the pin, wherein the membrane-based actuator and the pin are disposed within a horizontal space defined in the housing, and wherein the release fitting is disposed within a vertical space defined in the housing; and
    a snubber mount positioned on the housing for retaining a snubber connected to the single-point release device, wherein the snubber is mounted on the center of the set of panels.

3. The spacecraft of claim 1, wherein the single-point release device further comprises:
    a release nut coupled to the release rod, a diameter of the release nut being greater than a diameter of the release rod, wherein the release rod is projected through the set of panels when the set of panels is in a stowed position.

4. The spacecraft of claim 1, wherein the release rod is configured to deploy the set of panels to a deployed position.

5. The spacecraft of claim 1, wherein the heater is disposed adjacent to the membrane-based actuator for activating the single-point release device in response to receiving an electrical signal, wherein the heater comprises a plurality of electrical systems to activate the heater.

6. The spacecraft of claim 1, wherein the membrane-based actuator comprises a membrane disposed between the thermally sensitive material and the pin.

7. The spacecraft of claim 1, wherein the membrane-based actuator is a sealed deformable membrane-based actuator that prevents leakage of the thermally sensitive material.

8. The spacecraft of claim 1, wherein the thermally sensitive material is a paraffin wax.

9. The spacecraft of claim 8, wherein the thermally sensitive material is expanded to extend the membrane-based actuator toward the pin.

10. A spacecraft comprising:
    a main body;
    one or more panels attached to a first end of the main body, wherein the one or more panels are deployable from a stowed position to a deployed position; and
    a single-point release device attached to the one or more panels, wherein the one or more panels are retained in the stowed position by only one single-point release device, wherein the single-point release device comprises:
        an actuator for providing a mechanical movement based on a thermally sensitive material contained in the actuator, the thermally sensitive material being configured to expand upon receiving a thermal energy and cause the actuator to extend; and
        a release fitting and a release rod for retaining and selectively releasing a pin, wherein the extended actuator is configured to push the pin to release the pin from the release fitting.

11. The spacecraft of claim 10, wherein the single-point release device comprises:
    a release nut coupled to the release rod for restricting a movement of the one or more panels when the one or more panels are in the stowed position; and
    a heating source engaged with the actuator, wherein the heating source receives a signal from the main body to generate the thermal energy.

12. The spacecraft of claim 10, further comprising:
    a set of snubbers mounted on a panel of the one or more panels, the set of snubbers comprising a central snubber mounted in the center of the panel, wherein the central snubber is connected to the single-point release device.

13. The spacecraft of claim 10, wherein the actuator further comprises a membrane disposed between the thermally sensitive material and the pin.

14. The spacecraft of claim 10, wherein the thermally sensitive material is a paraffin wax.

15. A method of actuating a single-point release mechanism comprising:
    receiving an electrical signal to activate a heating source mounted on a spacecraft body;

receiving, at a membrane-based actuator, a thermal energy from the heating source, wherein the thermal energy expands a thermally sensitive material contained in the membrane-based actuator, wherein the expanded thermally sensitive material extends the membrane-based actuator;

releasing a pin from a release fitting by facilitating a movement of the membrane-based actuator, wherein the extended membrane-based actuator is configured to push the pin through the release fitting; and upon releasing the pin from the release fitting, deploying a plurality of panels, wherein, prior to the releasing, only one single-point release mechanism retains the plurality of the panels.

16. The method of claim 15, wherein the membrane-based actuator is a deformable material-based actuator including a membrane disposed between the membrane-based actuator and the pin.

17. The method of claim 15, wherein the thermally sensitive material is a paraffin wax.

18. The method of claim 15, wherein the membrane-based actuator is sealed to prevent leakage of the thermally sensitive material.

19. The method of claim 15, further comprising:

positioning a snap-in snubber on a panel of the plurality of panels, the snap-in snubber comprising a top portion and a bottom portion, wherein the panel is disposed between the top portion and the bottom portion of the snap-in snubber.

20. The method of claim 19, further comprising:

enclosing a release rod by the snap-in snubber, wherein the release rod fits within a hole defined in the snap-in snubber.

* * * * *